Dec. 8, 1936.  J. DYKSTRA  2,063,729
EMERGENCY BRAKE HOOK-UP
Filed Sept. 25, 1935
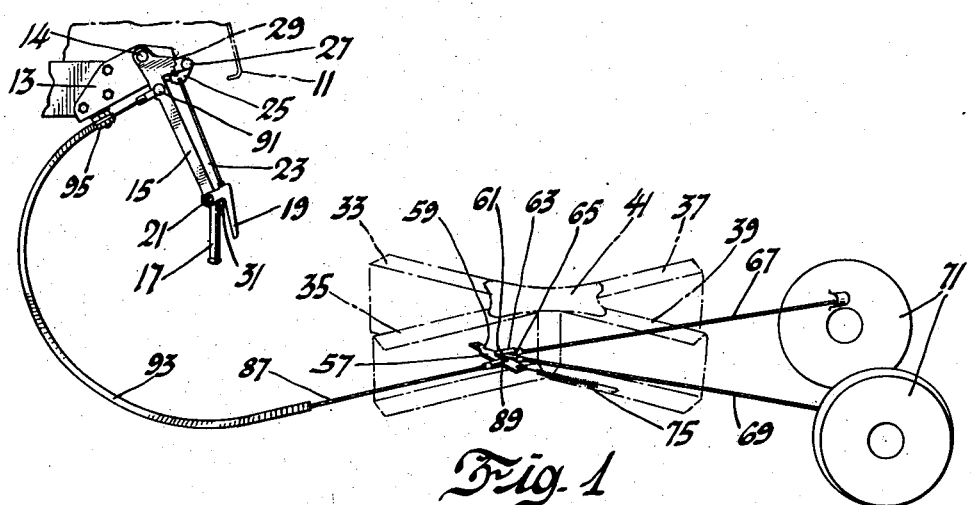
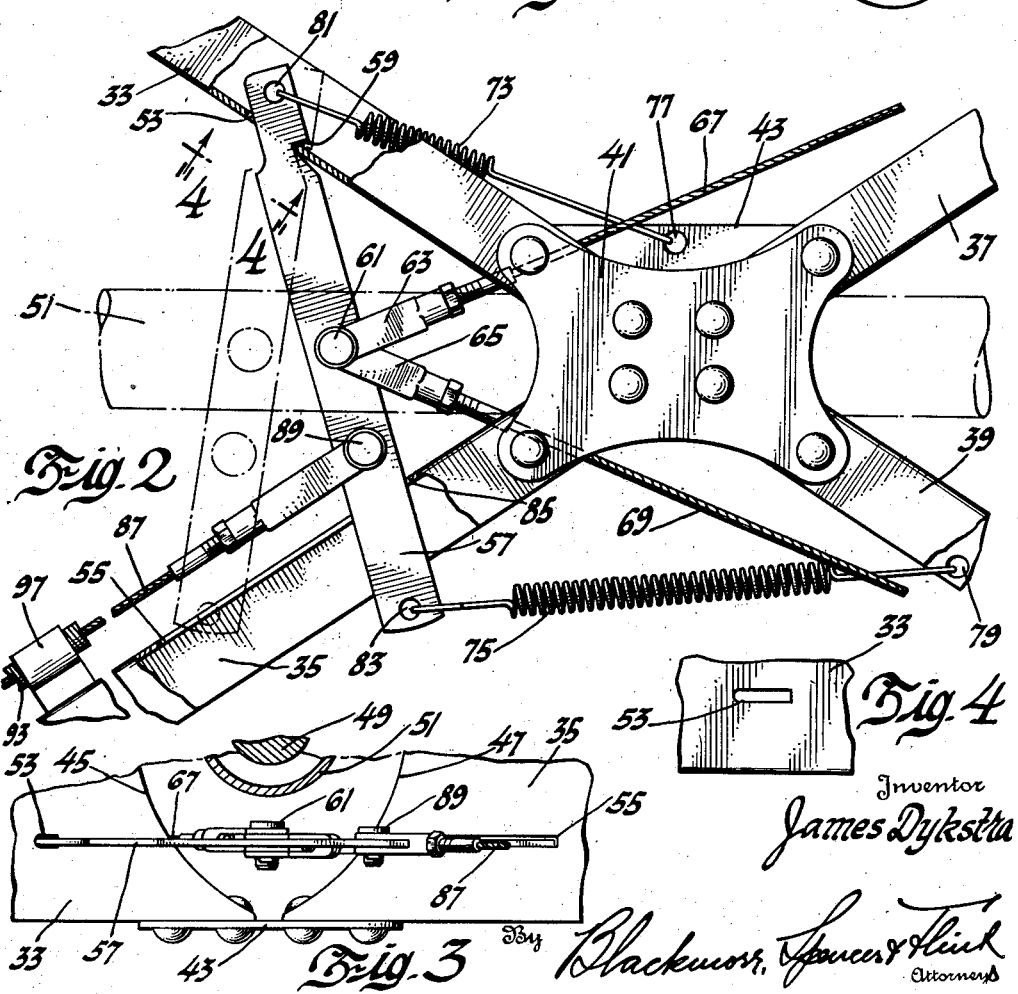
Inventor
James Dykstra
By Blackmore, Spencer & Flint
Attorneys Patented Dec. 8, 1936

2,063,729

UNITED STATES PATENT OFFICE 2,063,729

EMERGENCY BRAKE HOOK-UP

James Dykstra, Lansing, Mich., assignor to General Motors Corporation, Detroit, Mich., a corporation of Delaware Application September 25, 1935, Serial No. 42,017

8 Claims. (Cl. 188—2)

This invention relates to brakes and particularly to vehicle brakes.

The object of the invention is to improve the emergency means for applying the brakes.

A further object is to provide a very simple and inexpensive hookup for emergency application of wheel brakes.

Other objects will be understood from the following description.

The invention is illustrated on an accompanying drawing in which:

Fig. 1 is a diagrammatic view.

Fig. 2 is a plan view.

Fig. 3 is a view in elevation looking from the left end of Fig. 2.

Fig. 4 is a detail in elevation.

On the drawing, numeral 11 is the instrument panel of a motor vehicle. Suitably secured beneath the panel is a bracket 13 to which is pivoted at 14 the upper end of lever 15. The lever projects downward into the driver's compartment and has a hand grip 17. To the lever is pivoted at 21 a finger 19 connected by a link 23 to a pawl 25 also pivoted to lever 15 at 27 and engaging teeth 29 on the bracket. Spring means 31 bias the pawl into locking engagement with the teeth to prevent clockwise rotation of the lever 15.

The vehicle frame is of the X-type. It has diagonally arranged frame members 33, 35, 37, 39. At their junction they are secured together by top and bottom plates 41 and 43. The frames are of U-shape and their webs are cut away as shown at 45 and 47 in Fig. 3 for the passage of the conventional propeller shaft 49 and its housing 51.

The web of frame member 33 has a short slot 53 and the web of frame 35 has a long slot 55. The short slot has a vertical rear wall to serve as a lever fulcrum as will be explained. A lever 57 rectangular in section has one end of reduced width so as to be capable of being projected through slot 53 only when its long axis is substantially normal to the plane of the slot. It is formed with a hook 59 to engage the rear edge of the slot and to prevent its escape. At a point 61 intermediate the length of the lever are connected yokes 63, 65 at the ends of cables 67, 69 which cables extend to the brakes associated with the drums 71 on the rear wheels as shown by Fig. 1. It will be noticed that the opening for the propeller shaft formed in frame members 33 and 35 is of such dimensions as to permit the passage of the cables, the lever and cables being located beneath the propeller shaft as shown by Fig. 3. Springs 73 and 75 are connected at 77 and 79 to the lower plate 43 and rear frame bar 39, respectively, at their rear ends and at 81 and 83 to the ends of the lever. These springs bias the lever to the position shown by Fig. 2 wherein the hook engages the rear wall of slot 53 and wherein rearward swinging of the lever is stopped by the rear wall 85 of slot 55. A cable 87 is connected to the lever 57 at 89 and to the manually operable emergency lever at 91. The cable is carried in a housing 93 secured to the bracket 13 at 95 and to the frame bar 35 at 97. Counterclockwise rotation of the lever 15 pulls the cable 87 through its housing and rocks lever 57 about its hooked end as a pivot to apply the brakes.

The lever 57 may be easily installed, its notched end being projected through slot 53. The pull of the cables 67 and 68 and the spring 75 prevent its being pulled out as will be obvious. Spring 75 holds it normally in its position of rest and against the stop 85 at the end of slot 55.

Although no other brake applying means is shown it will be understood that other applying means, either mechanical, hydraulic, or servo may be used for service application of the rear brakes, those herein shown as applied by the emergency lever, and also for application of front wheel brakes where four wheel brakes are used. Since such service applying means is not a part of this invention it is not shown, nor described.

I claim:

1. Brake applying means for a vehicle having a frame bar, said bar having a slot, a lever fulcrumed within and about an end of said slot, cable means attached to and extending from said lever and operable to apply brakes when the lever is rocked about its fulcrum, brake actuating means including a second lever and connecting means between said levers.

2. The invention defined by claim 1, said lever having a transverse dimension permitting it to be projected through said slot only when its long axis is substantially normal to the plane of the slot whereby the lever may be readily assembled and securely retained.

3. The invention defined by claim 1, said lever having a hook adjacent one end to engage the end of the slot and dimensioned at said end to permit its assembly only when its long axis is substantially normal to the plane of said slot.

4. The invention defined by claim 1, said vehicle having a second frame bar, said second frame bar having a slot to guide said lever, the end wall of said slot engaging the lever to limit its movement and determine the brake release position thereof.

5. In a vehicle, an instrument panel, a lever projecting downwardly from a pivot concealed in advance of said panel, wheel brakes, brake hook-up between said lever and brakes comprising a second lever, a housed flexible cable between said levers and a plurality of cables jointly connected to said second lever and adapted to apply said brakes, said vehicle having laterally spaced frame bars each having a vertical web, slots in said webs, said second lever having a hook at one end fulcrumed on an end wall of one of said slots, said other slot guiding and limiting the movement of said second lever.

6. In a motor vehicle having frame bars forming an X frame, said bars cut away adjacent their region of intersection, a propeller shaft extending through the opening formed thereby, a transversely arranged lever beneath said propeller shaft, said lever fulcrumed on one bar of said frame and guided by a laterally disposed frame bar, means to rock said lever about its fulcrum, cables connected to said levers, extended through said opening and operable to apply brakes when the lever is rocked.

7. The invention defined by claim 6 together with yielding means to hold said lever in its brake release position and to prevent rattling.

8. In a vehicle, an instrument panel, a lever projecting downwardly from a pivot concealed in advance of said panel, wheel brakes, brake hook-up between said lever and brakes comprising a second lever, a housed flexible cable between said levers and a plurality of cables jointly connected to said second lever and adapted to apply said brakes, said vehicle having a frame and said second lever being fulcrumed therein.

JAMES DYKSTRA.